US010558422B2

(12) United States Patent
Moore et al.

(10) Patent No.: US 10,558,422 B2
(45) Date of Patent: *Feb. 11, 2020

(54) USING A PLURALITY OF BUFFERS TO PROVIDE AUDIO FOR SYNCHRONIZED PLAYBACK TO MULTIPLE AUDIO DEVICES HAVING SEPARATE DEVICE CLOCKS

(71) Applicant: Apple Inc., Cupertino, CA (US)

(72) Inventors: Jeffrey C. Moore, Daly City, CA (US); William George Stewart, Eaglemont (AU); Gerhard Lengeling, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 104 days.

This patent is subject to a terminal disclaimer.

(21) Appl. No.: 15/952,118

(22) Filed: Apr. 12, 2018

(65) Prior Publication Data

US 2018/0336003 A1    Nov. 22, 2018

Related U.S. Application Data

(60) Continuation of application No. 15/397,558, filed on Jan. 3, 2017, now Pat. No. 9,977,648, which is a
(Continued)

(51) Int. Cl.
*G06F 3/00* (2006.01)
*G06F 3/16* (2006.01)
(Continued)

(52) U.S. Cl.
CPC .............. *G06F 3/165* (2013.01); *G06F 3/162* (2013.01); *G11B 20/10527* (2013.01);
(Continued)

(58) Field of Classification Search
CPC ....................................................... G06F 3/165
See application file for complete search history.

(56) References Cited

U.S. PATENT DOCUMENTS 5,245,667 A    9/1993   Lew
5,664,044 A    9/1997   Ware
(Continued)

FOREIGN PATENT DOCUMENTS

EP    0830026 A2    3/1998
EP    1143719 A2    10/2001
(Continued)

OTHER PUBLICATIONS

Merlin Hughes: "Turning streams inside out, Part 2 : Optimizing internal Java I/O" Java Cryptographer, Online! pp. 1-17, XP002348074 Retrieved from the Internet: URL: http://www-128. i-bm.com/_developerworks/java/library/j-io2/?t=egrL296&p=streams2>.
(Continued)

*Primary Examiner* — Tammara R Peyton
(74) *Attorney, Agent, or Firm* — Invoke

(57) ABSTRACT

According to one embodiment, a media system communicates with an aggregate device that includes multiple media output devices. When providing media data for presentation, the system adjusts for device clock drift by resampling the media data provided to a media output device based at least in part on a device clock rate difference between a device clock of one of the media output devices and a device clock of another of the media output devices.

27 Claims, 4 Drawing Sheets

Related U.S. Application Data continuation of application No. 14/930,601, filed on Nov. 2, 2015, now Pat. No. 9,569,169, which is a continuation of application No. 14/557,349, filed on Dec. 1, 2014, now Pat. No. 9,176,706, which is a continuation of application No. 13/477,681, filed on May 22, 2012, now Pat. No. 8,904,066, which is a continuation of application No. 12/605,137, filed on Oct. 23, 2009, now Pat. No. 8,185,674, which is a division of application No. 10/877,762, filed on Jun. 25, 2004, now Pat. No. 7,631,119.

(51) Int. Cl.
| | |
|---|---|
| *H04L 29/08* | (2006.01) |
| *H04N 21/4143* | (2011.01) |
| *H04N 21/43* | (2011.01) |
| *H04N 21/81* | (2011.01) |
| *H04N 21/44* | (2011.01) |
| *G11B 20/10* | (2006.01) |

(52) U.S. Cl.
CPC .......... *H04L 67/10* (2013.01); *H04L 67/1095* (2013.01); *H04N 21/4143* (2013.01); *H04N 21/4307* (2013.01); *H04N 21/44004* (2013.01); *H04N 21/8106* (2013.01); *G06F 3/00* (2013.01)

(56) References Cited

U.S. PATENT DOCUMENTS

| | | | |
|---|---|---|---|
| 5,664,226 | A | 9/1997 | Czako et al. |
| 5,842,171 | A | 11/1998 | Greenwood et al. |
| 5,875,354 | A | 2/1999 | Charlton et al. |
| 6,092,119 | A | 7/2000 | Rossmere et al. |
| 6,408,011 | B1 | 6/2002 | Nakatsugawa |
| 6,598,172 | B1 | 7/2003 | Vandeusen et al. |
| 6,715,036 | B1 | 3/2004 | Burton et al. |
| 6,862,635 | B1 | 3/2005 | Alverson et al. |
| 7,024,575 | B2 | 4/2006 | Lienhart et al. |
| 7,084,898 | B1 | 8/2006 | Firestone et al. |
| 7,262,716 | B2 | 8/2007 | Yu et al. |
| 7,266,713 | B2 | 9/2007 | Lienhart et al. |
| 7,821,574 | B2 | 10/2010 | Black |
| 7,836,194 | B2 | 11/2010 | Mantegna et al. |
| 8,190,680 | B2 | 5/2012 | Spilo et al. |
| 8,195,472 | B2 | 6/2012 | Crockett |
| 8,234,395 | B2 | 7/2012 | Millington |
| 8,311,657 | B2 | 11/2012 | Cannistraro et al. |
| 8,689,036 | B2 | 4/2014 | Millington et al. |
| 9,207,905 | B2 | 12/2015 | Millington |
| 9,569,169 | B2 | 2/2017 | Moore et al. |
| 9,787,550 | B2 | 10/2017 | Millington et al. |
| 2001/0008535 | A1 | 7/2001 | Lanigan |
| 2002/0081098 | A1 | 6/2002 | Scally |
| 2003/0200001 | A1 | 10/2003 | Goddard |
| 2004/0128402 | A1 | 7/2004 | Weaver et al. |
| 2005/0201398 | A1 | 9/2005 | Naik et al. |
| 2005/0226233 | A1 | 10/2005 | Kryuchkov et al. |
| 2005/0240745 | A1 | 10/2005 | Iyer et al. |
| 2005/0288805 | A1 | 12/2005 | Moore et al. |
| 2006/0074637 | A1 | 4/2006 | Berreth |
| 2010/0042238 | A1 | 2/2010 | Moore et al. |
| 2010/0042239 | A1 | 2/2010 | Moore et al. |
| 2012/0232682 | A1 | 9/2012 | Moore et al. |
| 2015/0186104 | A1 | 7/2015 | Moore et al. |
| 2018/0336003 | A1* | 11/2018 | Moore .............. H04N 21/4143 |

FOREIGN PATENT DOCUMENTS

| | | |
|---|---|---|
| WO | 92/17951 A1 | 10/1992 |
| WO | 00/60592 A1 | 10/2000 |
| WO | 01/26374 A1 | 4/2001 |
| WO | 01/52553 A1 | 7/2001 |

OTHER PUBLICATIONS

Clifton, David, "pipe.c", A K1a2 Module, retrieved from: http://www.codelode.com/Kernel/kla2pipec.html , 2003, 11 pages.

"Application-Specified Ring Buffers With Subsystem Pointer Management and Optional Intermediate Buffers for Digital Communications", IBM Technical Disclosure Bulletin, International Business Machines Corp. (Thornwood), US, vol. 32, No. 5A, Oct. 1, 1989 (Oct. 1, 1989), p. 319/320, XP000048931.

* cited by examiner

USING A PLURALITY OF BUFFERS TO PROVIDE AUDIO FOR SYNCHRONIZED PLAYBACK TO MULTIPLE AUDIO DEVICES HAVING SEPARATE DEVICE CLOCKS

BENEFIT CLAIM

This application claims benefit as a Continuation of U.S. patent application Ser. No. 15/397,558, filed Jan. 3, 2017, which is a Continuation of U.S. patent application Ser. No. 14/930,601, filed Nov. 2, 2015, issued as U.S. Pat. No. 9,569,169 on Feb. 14, 2017, which is a Continuation of U.S. patent application Ser. No. 14/557,349, filed Dec. 1, 2014, issued as U.S. Pat. No. 9,176,706 on Nov. 3, 2015, which is a Continuation of U.S. patent application Ser. No. 13/477,681, filed May 22, 2012, issued as U.S. Pat. No. 8,904,066 on Dec. 2, 2014, which is a Continuation of application Ser. No. 12/605,137, filed Oct. 23, 2009, issued as U.S. Pat. No. 8,185,674 May 22, 2012, which is a Divisional of application Ser. No. 10/877,762, filed Jun. 25, 2004, issued as U.S. Pat. No. 7,631,119 on Dec. 9, 2009, the entire contents of each of which is hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

TECHNICAL FIELD

The present invention relates to synchronizing audio with multiple devices and, more specifically, to handling the communication of audio information between applications and multiple devices.

BACKGROUND

Electronic devices, such as computer systems, typically communicate with audio devices through device drivers associated with the audio devices. For example, a computer system plays sound on a speaker by sending audio information to a device driver designed for the speaker. Similarly, a computer system captures audio information from a microphone by receiving audio data from the device driver associated with the microphone.

Various approaches may be used to handle the communication of audio information between client applications ("clients") that use audio information and the device drivers of audio devices. For example, according to an interrupt-based approach, a direct connection is established between the driver and its client application. Any time the driver wants audio data from the client, the driver raises an interrupt, suspending other activity on the Central Processing Unit ("CPU") of the computer system on which the client is running. Therefore, for a certain period of time, the driver is in control of the computer system.

To avoid problems associated with the interrupt approach, a "ring buffer" approach has been developed. According to the ring buffer approach, execution of a device driver is decoupled from execution of its client application by using a ring buffer as a rendezvous point for communicating audio data between the device driver and the client application. Specifically, the device driver for a playback device reads audio data from the ring buffer without directly communicating with the client application. The client application, in turn, feeds audio data into the ring buffer ahead of the device driver so that the device driver continues to have new audio data to read. Similarly, the device driver for a recording device writes audio data into the ring buffer without directly communicating with the client application. The client application, in turn, reads audio data from the ring buffer at a rate to ensure that the device driver does not overwrite unread audio data.

As audio systems become more sophisticated, the type and number of audio devices used by a system has increased. Consequently, there is a need to be able to send audio to multiple playback devices connected to a system in a manner that results in synchronized playback by the multiple devices. Similarly, there is a need to be able to consume audio from multiple audio sources connected to a system, to allow a single client application to concurrently consume audio from the various audio sources.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Audio I/O System

As mentioned above, using the ring buffer approach, an audio I/O system communicates audio data to and from devices by using a ring buffer as a rendezvous point for the audio data. Such an audio I/O system typically includes (1) a ring buffer, where audio data is written to and read from, (2) a device-side audio handling I/O unit ("DIO") (typically a device driver), and (3) an system-side audio handing I/O unit ("SIO"). A specific example of such a system is illustrated in FIG. 1.

Figure 1:
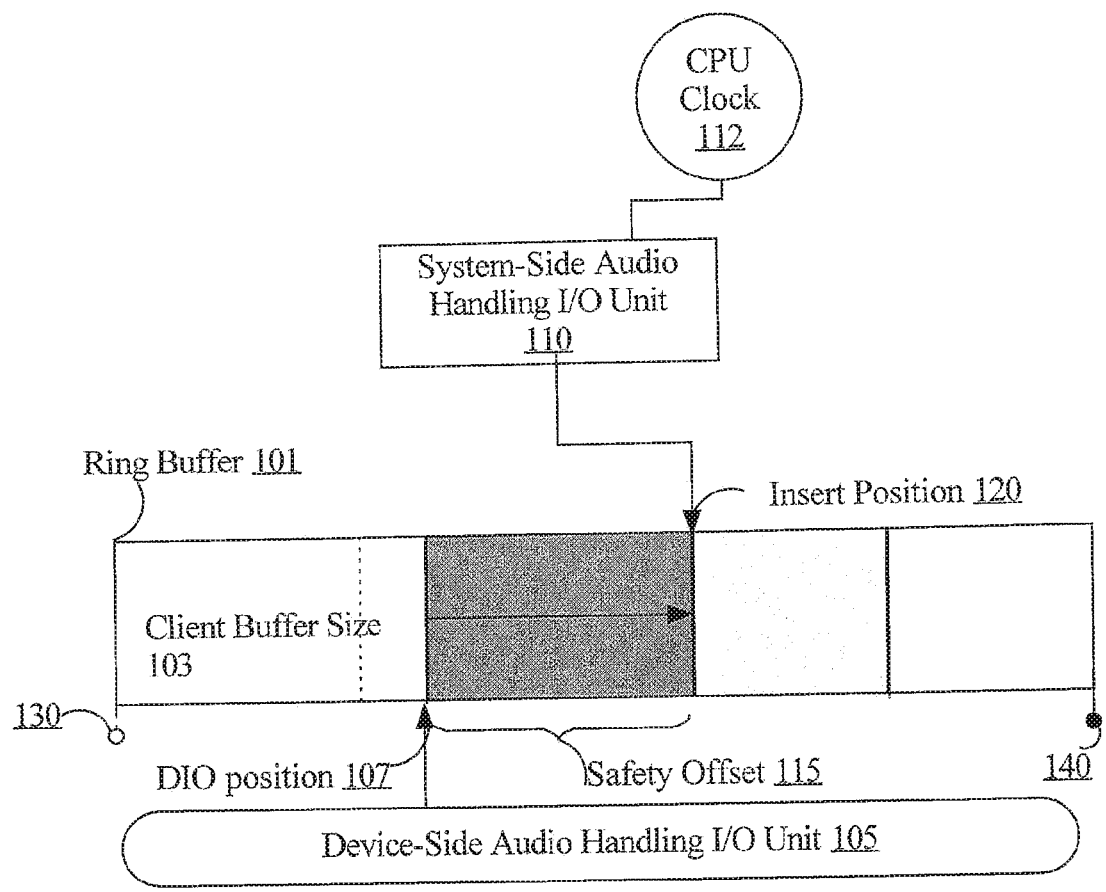
FIG. 1 is a block diagram of a system in which audio is communicated between an system-side audio handling I/O unit and a device-side audio handling I/O unit through the use of a ring buffer.

Referring to FIG. 1, it illustrates an audio I/O system 100 that includes a DIO 105, an SIO 110, and a ring buffer 101. For the purpose of illustration, it shall be assumed that DIO 105 is a device driver for a playback device, such as a speaker. Thus, DIO 105 reads audio data from ring buffer 101.

SIO 110 generally represents a system-side entity through which applications communicate with audio devices. For example, the operating system of a computer system may provide an interface through which applications make calls to communicate with audio devices. In response to such calls, the operating system executes a routine to perform the requested audio transfer operation. SIO 110 may be, for example, an Audio Hardware Abstraction Layer (HAL) provided in the core audio framework of MAC OS X, generally available from Apple Computer, Inc.

While playing back audio from ring buffer 101, DIO 105 reads audio data from ring buffer 101. The specific position, within ring buffer 101, from which DIO 105 is reading audio data at any given point in time is referred to herein as the "DIO position" within ring buffer 101. The DIO position wraps around to the start 130 of ring buffer 101 upon reaching the end 140 of ring buffer 101.

It is the responsibility of SIO 110 to place audio data into ring buffer 101 in front of the DIO position of DIO 105 so that it may be subsequently consumed by DIO 105. To place audio data in the appropriate location within ring buffer 101, SIO 110 needs to know the current DIO position. However, it would be impractical for DIO 105 to continuously communicate its position to the SIO 110. Therefore, according to one embodiment, DIO 105 periodically generates information that SIO 110 can use to estimate the current DIO position.

In one embodiment, the information used by SIO 110 to estimate the current DIO location is timestamp information generated by DIO 105 when DIO 105 performs a wrap around operation. Specifically, when DIO 105 reaches the end 140 of ring buffer 101, DIO 105 generates timestamp information that indicates (1) the current clock time of the CPU clock 112, and (2) an indication of which audio samples have been processed by DIO 105. From this timestamp information, and the current time of CPU clock 112, SIO 110 is able to estimate the current DIO position at any given point in time, and thereby determine the appropriate point at which to insert audio data within ring buffer 101 (the "insertion point").

Once SIO 110 has determined the current DIO position, SIO 110 must determine how far ahead of the DIO position to insert audio data. In particular, to ensure proper playback, SIO 110 may add a safety offset 115 to the current DIO position. The specific safety offset 115 used by SIO 110 may vary based on the nature of the audio device associated with the DIO 105. Essentially, a safety offset is a limitation on how close the SIO 110 can write data in Buffer 101 ahead of the current DIO position 107.

Moreover, in one embodiment, the SIO 110 may allow the application that is providing the audio data up to a full buffer unit in addition to the safety offset 115 to deliver audio data to the SIO 110 for writing. Hence, when SIO 110 wakes up to write data to buffer 101, the application providing the audio data may take potentially as much real time to compute the data as it is going to take to play it, and no more. Thus, based on a prediction of where the current DIO position 107 is, the SIO 110 may decide that the appropriate insertion point is at point 120.

Aggregate Devices

Figure 2:
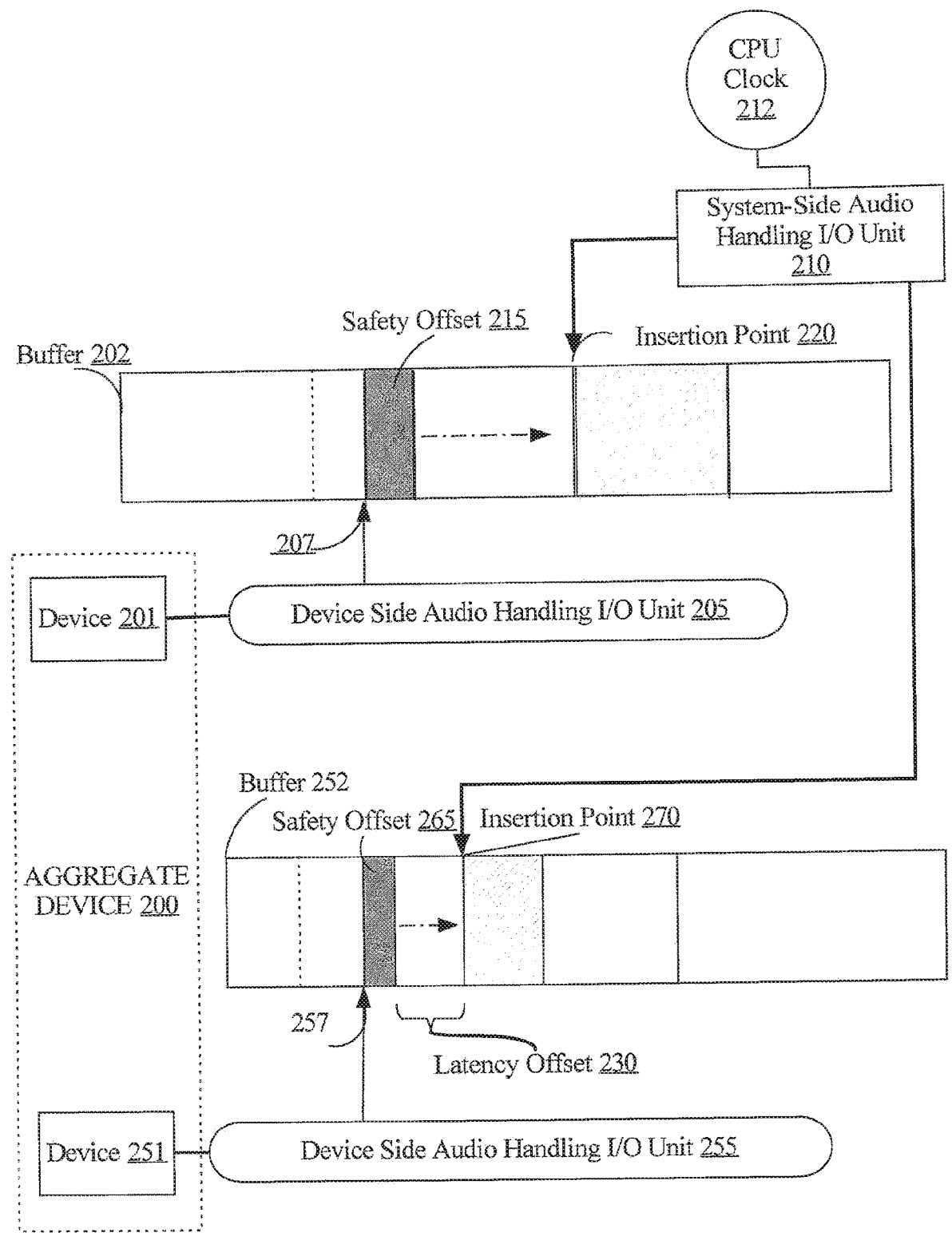
FIG. 2 is a block diagram of a system in which audio is communicated between an system-side audio handling I/O unit and multiple device-side audio handling I/O units through the use of multiple ring buffers.

An aggregate device is a collection of devices that may be treated by an application as if it were a single device. According to one embodiment, a single SIO is used for synchronized playback and/or synchronized receipt of audio from an aggregate device. FIG. 2 is a block diagram illustrating a system for synchronizing communications with an aggregate device, according to an embodiment of the invention.

Referring to FIG. 2, Aggregate Device 200 includes multiple devices 201 and 251, all of which are communicating with a single SIO 210. For the purpose of explanation, it shall be assumed that devices 201 and 251 are audio playback devices, and that SIO 210 is receiving audio from an application for synchronized playback on devices 201 and 251.

As illustrated in FIG. 2, each device 201 and 251 has its own ring buffer (buffers 202 and 252, respectively). Each device 201 and 251 may have its own buffer size and safety offset, e.g., safety offset 215 and safety offset 265. In addition, each device 201 and 251 may have its own device clock that affects the rate at which the device consumes audio data. Consequently, at any given time, the current DIO positions 207 and 257 of the devices may be at different points in their respective ring buffers 202 and 252.

According to one embodiment, each DIO 205 and 255 generates timestamp information every time the DIO performs a wrap-around operation. The SIO 210 uses the timestamp information from each DIO 205 and 255 to independently determine the current DIO position of each device. However, if the insertion positions selected by the SIO 210 are made without consideration to the fact that the device belong to an aggregate device, the devices will inevitably get out of synchronization, and the quality of the audio experience will degrade. According to one embodiment, SIO 210 is designed to compensate for factors that result in such degradation, including differences presentation latency and device clock rates.

Correcting for Differences in Presentation Latency

The presentation latency of a device is the actual amount of time between when the device's DIO reads data from a ring buffer and when the device actually plays the audio data. If the devices that belong to an aggregate device have different presentation latencies, then the sound played by some of the devices will lag behind the sound played by other devices, unless some form of adjustment is made for the differences.

According to one embodiment, the SIO 210 receives presentation latency data about the presentation latency of each device 201 and 251 in aggregate device 200. The SIO 210 adjusts the insertion points within buffers 202 and 252 so that each device plays the same audio data at the same time.

Figure 3:
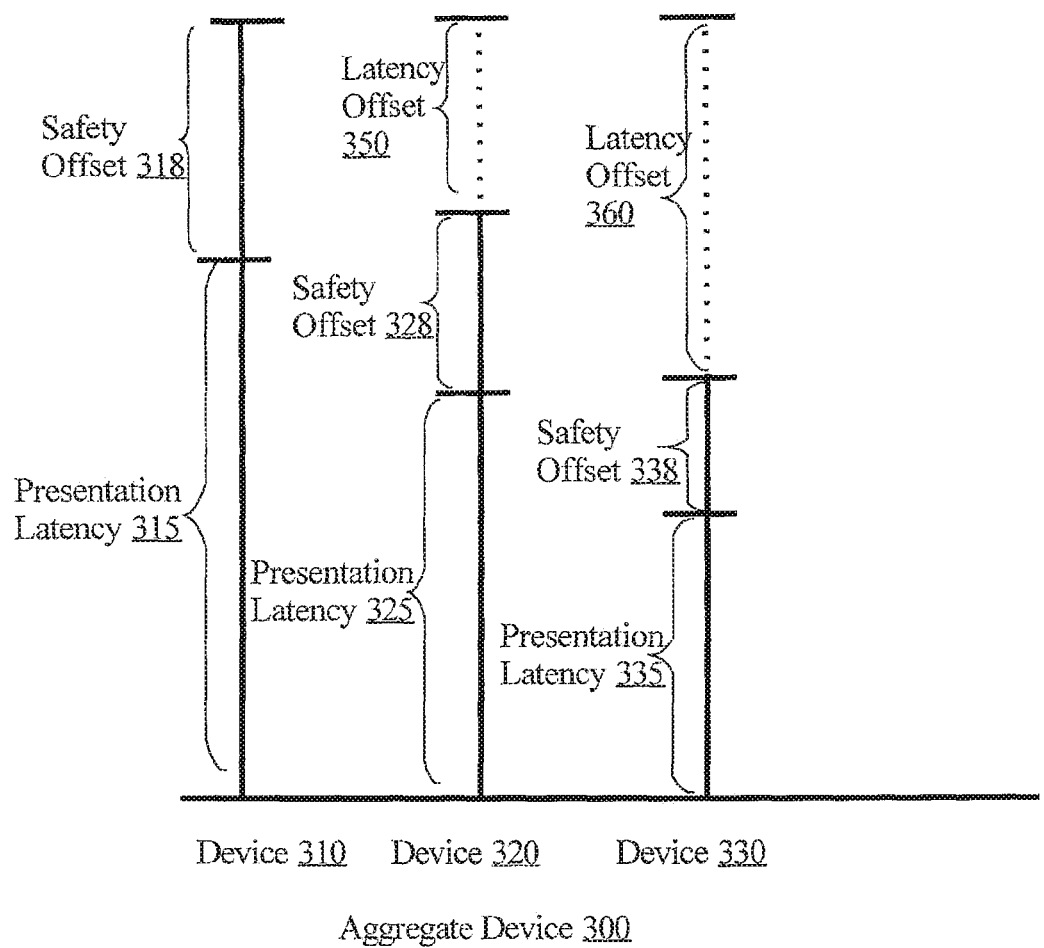
FIG. 3 illustrates how an system-side audio handling I/O unit determines an offset into ring buffers for some devices based on offset latencies of other devices.

Techniques for correcting for differences in presentation latency shall now be described with reference to FIG. 3. Referring to FIG. 3, it illustrates a scenario in which an aggregate device includes 3 devices 310, 320 and 330. Each device 310, 320 and 330 has a corresponding presentation latency. The presentation latency of each device may be determined experimentally by each device and supplied to the Aggregate SIO, as previously discussed.

According to one embodiment, how far ahead the SIO writes ahead of each DIO position of each device takes into account a latency offset (350 and 360), as well as the safety offset of the device. While the safety offset of a particular device is dictated by the characteristics of that particular device, the latency offset of a particular device is dictated by how the characteristics of the other devices that belong to the same aggregate device differ from the characteristics of that particular device. Specifically, according to one embodiment, the latency offset for a given device is based on the difference between the composite latency of the device (safety offset+presentation latency) and the maximum composite latency of any device in the aggregate device. For example, device 310 has the highest composite latency (presentation latency 315+safety offset 318) of devices 310, 320 and 330. Therefore, the latency offset of each of devices 310, 320 and 330 is determined based on the difference between each of their composite latencies, and the composite latency of device 310.

In the illustrated example, the SIO compensates for the difference in the composite latency of device 310 and the composite latency of device 320 by using a latency offset 350 with device 320. Similarly, the SIO compensates for the difference in composite latency of device 330 with device 310 by using a latency offset 360 with device 330. Since device 310 has the highest composite latency, no latency offset is needed for device 310.

Referring again to FIG. 2, the gap between DIO position 257 and the insertion point 270 used by SIO 210 for device 251 takes into account both the safety offset 265 of device 251 and a latency offset 230. As explained above, latency offset 230 compensates for the difference between the composite latency (safety offset+presentation latency) of device 201 and the composite latency (safety offset+presentation latency) of device 251.

Correcting Clock Drift for Multiple Devices

Each audio device in an aggregate device may have its own device clock. The rate at which a device consumes and/or produces audio is driven by the device clock. Due to differences in device clocks, device clocks may "tick" at slightly different rates. Hence, although both device 201 and 251 are theoretically running at the same rate, device 201 may actually be consuming samples from buffer 202 faster than device 251. Over short periods of time, such differences may not be detectable. However, over time, the distortion caused by such "clock drift" increases. If not addressed, clock drift between the devices that make up an aggregate device will lead to a situation where the synchronized data provided by the SIO is not being played by the devices in synchronization.

According to one embodiment, the SIO compensates for rate discrepancies between clocks on different devices of the same aggregate device. Specifically, based on the timestamp information supplied by each DIO, the SIO determines how fast the device clocks are actually running, and performs dynamic resampling on audio data prior to inserting the audio data into the ring buffer of one or more of the devices.

According to one embodiment, SIO designates one device to be the "master device" against which to compare the clock rates of other devices. Preferably, the device designated by the SIO to be the master device would be the device with the most stable device clock. In one embodiment, the device that reports the most latency is designated as the master device. In another embodiment, the master designation may be dynamically changed based on a variety of factors. For example, during playback the SIO may determine that one device in the aggregate device would be a better master than the currently designated master. In response to such a designation, the SIO may change the master designation, and begin compensating for clock drift based on the clock speed of the new master.

Once a master device has been designated, the SIO resamples the audio data provided to the other devices to correct/makeup for the discrepancy between their device clock rates and the device clock rate of the master device. Specifically, if a device has a slower clock rate than the master device, then the audio data for a given segment of audio is reduced. When the slower device consumes the reduced-size audio data, the slower device effectively "catches up" relative to the master device. Conversely, if a device has a faster clock rate than the master device, then the audio data for a given segment of audio is increased. When the faster device consumes the increased-size audio data, the faster device is effectively "slowed down" relative to the master device.

Any one of numerous well-known techniques for resampling audio data may be used to perform the resample. The present invention in not limited to any particular resampling technique.

Although SIO 210 is designed to compensate for clock drift among members of an aggregate device, it is also able to handle scenarios in which a mechanism is used to prevent clock drift. For example, if all of the devices that belong to an aggregate device are being driven by the same clock, then no clock drift will occur. In this scenario, the SIO determines that no resampling is required.

Synchronizing the Receipt of Audio from Multiple Devices

While embodiments described above have used examples in which audio is synchronously provided to an aggregate device, the same techniques may be used to provide synchronous receipt of audio data from multiple audio source devices. Thus, rather writing audio data ahead of the DIO position of multiple audio-consuming devices, the SIO reads audio data behind the DIO position of the audio-producing devices. Similar to the scenarios described above, the offset between the SIO reading-position and the DIO insertion positions includes a safety offset, and a latency offset that compensates for the difference between (1) safety offsets, and (2) time lapse between (a) when each device receives audio data and (b) when the device places the data into its corresponding ring buffer.

Multiple SIO Systems

In the examples given above, a single SIO is providing audio data to, or receiving audio data from, an aggregate audio device. However, multiple SIOs can concurrently communicate with the same aggregate device. Thus, while SIO 210 is writing audio data for one application into ring buffers 202 and 252 for playback on devices 201 and 251, a second SIO may be doing the same for a different application. Under these circumstances, the second SIO would compensate for clock drift, presentation latency differences, and safety offset differences, in the same manner as SIO 210. However, in adjusting for clock drift, the second SIO need not select the same device to be the master device.

The aggregate devices with which SIOs interact may not have identical memberships. For example, a first SIO may be providing audio for synchronized playback on a first aggregate device that includes devices A, B and C. At the same time, a second SIO may be providing audio for synchronized playback on a second aggregate device that includes devices B, C, and D. In this scenario, both SIOs are inserting audio data for devices B and C into the ring buffers for devices B and C. However, they determine latency offsets and resampling adjustments based on the specific membership of their aggregate devices, and their independent selection of a master device.

Single-Thread of Execution

According to one embodiment, each SIO is run as a single thread of execution, regardless of how many devices belong to the aggregate device with which the SIO exchanges audio data. Consequently, audio applications are able to provide synchronized audio to multiple devices without having to include the complexities inherent in managing multiple execution threads. The single thread of execution determines appropriate insertion points into each of the multiple ring buffers using the techniques described above, thereby insulating the audio applications from the complexity of dealing with multiple audio devices.

Hardware Overview

Figure 4:
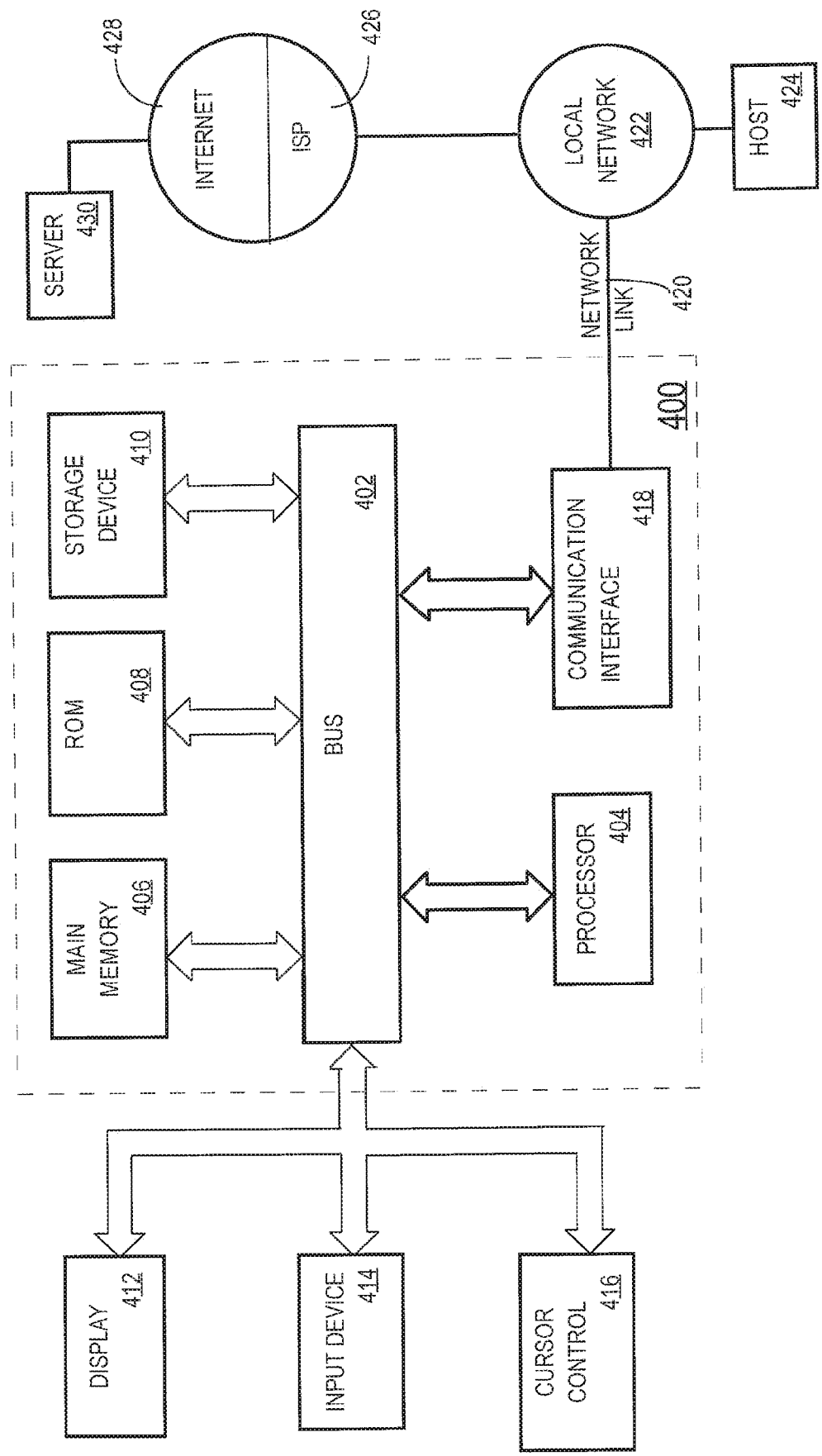
FIG. 4 is a block diagram illustrating a computer system upon which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other non-transitory medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method for writing data for synchronized playback by a first playback device and a second playback device, the method comprising:
   writing, by a computing device, data into a first buffer and a second buffer, wherein the first buffer is associated with the first playback device, and wherein the second buffer is associated with the second playback device; and
   determining, by the computing device, where to write the data within each of the buffers based, at least in part, on presentation latencies of the first and second playback devices.

2. The method as recited in claim 1, wherein determining where to write the data within each of the buffers further comprises:
   determining, by the computing device, a first sum equal to a first safety offset added to a first presentation latency for the first playback device;
   determining, by the computing device, a second sum equal to a second safety offset added to a second presentation latency for the second playback device;
   determining, by the computing device, a maximum value from amongst the first sum and the second sum;
   determining, by the computing device, a first latency offset for the first playback device based on a difference between the first sum and the maximum value; and
   determining, by the computing device, a second latency offset for the second playback device based on a difference between the second sum and the maximum value.

3. The method as recited in claim 2, wherein the first safety offset indicates a minimum read ahead amount for writing the data for the first playback device, and wherein the second safety offset indicates a minimum read ahead amount for writing the data for the second playback device.

4. The method as recited in claim 1, wherein the computing device is selected from a group consisting of: the first playback device and the second playback device.

5. The method as recited in claim 1, wherein each playback device comprises a separate device clock, the method further comprising:
   determining, by the computing device, a difference between a first device clock rate of the first playback device and a second device clock rate of the second playback device; and
   resampling, by the computing device, the data to be written into the first buffer based at least in part on the difference.

6. The method as recited in claim 5, wherein determining the difference between the first device clock rate and the second device clock rate is based on a first timestamp information generated by the first playback device and a second timestamp information generated by the second playback device.

7. The method as recited in claim 5, wherein resampling the data to be written into the first buffer based at least in part on the difference comprises:
   in response to a determination that the first playback device is slower than the second playback device, reducing, by the computing device, a size of the data for at least a segment thereof to produce size-adjusted data;
   in response to a determination that the first playback device is faster than the second playback device, increasing, by the computing device, a size of the data for at least a segment thereof to produce the size-adjusted data; and
   writing, by the computing device, the size-adjusted data to the first buffer instead of the data.

8. The method as recited in claim 1, further comprising:
   upon reaching an end of the first buffer while writing the data to the first buffer, performing, by the computing device, a wrap-around operation to continue writing the data beginning at a start of the first buffer, wherein the first buffer comprises a ring buffer.

9. The method as recited in claim 1, further comprising:
   acquiring, by the computing device, the data as a digital data stream via a wireless connection to a network device.

10. A system for writing data for synchronized playback by a first playback device and a second playback device, the system comprising:
    at least one processor; and
    a non-transitory computer-readable medium storing instructions that cause the at least one processor to perform operations comprising:
       writing, by the at least one processor, data into a first buffer and a second buffer, wherein the first buffer is associated with the first playback device, and wherein the second buffer is associated with the second playback device; and
       determining, by the at least one processor, where to write the data within each of the buffers based, at least in part, on presentation latencies of the first and second playback devices.

11. The system as recited in claim 10, wherein the instructions that determine where to write the data within each of the buffers further causes the at least one processor to perform operations comprising:
    determining, by the at least one processor, a first sum equal to a first safety offset added to a first presentation latency for the first playback device;
    determining, by the at least one processor, a second sum equal to a second safety offset added to a second presentation latency for the second playback device;
    determining, by the at least one processor, a maximum value from amongst the first sum and the second sum;
    determining, by the at least one processor, a first latency offset for the first playback device based on a difference between the first sum and the maximum value; and
    determining, by the at least one processor, a second latency offset for the second playback device based on a difference between the second sum and the maximum value.

12. The system as recited in claim 11, wherein the first safety offset indicates a minimum read ahead amount for writing the data for the first playback device, and wherein the second safety offset indicates a minimum read ahead amount for writing the data for the second playback device.

13. The system as recited in claim 10, wherein either the first playback device or the second playback device comprises the at least one processor.

14. The system as recited in claim 10, wherein each playback device comprises a separate device clock, the operations further comprising:

determining, by the at least one processor, a difference between a first device clock rate of the first playback device and a second device clock rate of the second playback device; and resampling, by the at least one processor, the data to be written into the first buffer based at least in part on the difference.

15. The system as recited in claim 14, wherein the difference between the first device clock rate and the second device clock rate is based on a first timestamp information generated by the first playback device and a second timestamp information generated by the second playback device.

16. The system as recited in claim 14, wherein the instructions that resample the data to be written into the first buffer based at least in part on the difference further causes the at least one processor to perform operations comprising:

in response to a determination that the first playback device is slower than the second playback device, reducing, by the at least one processor, a size of the data for at least a segment thereof to produce size-adjusted data;

in response to a determination that the first playback device is faster than the second playback device, increasing, by the at least one processor, a size of the data for at least a segment thereof to produce the size-adjusted data; and writing, by the at least one processor, the size-adjusted data to the first buffer instead of the data.

17. The system as recited in claim 10, wherein the operations further comprise:

upon reaching an end of the first buffer while writing the data to the first buffer, performing, by the at least one processor, a wrap-around operation to continue writing the data beginning at a start of the first buffer, wherein the first buffer comprises a ring buffer.

18. The system as recited in claim 10, wherein the operations further comprise:

acquiring, by the at least one processor, the data as a digital data stream via a wireless connection to a network device.

19. A non-transitory computer-readable medium for writing data for synchronized playback by a first playback device and a second playback device, the non-transitory computer-readable medium storing instructions that cause at least one processor to perform operations comprising:

writing, by the at least one processor, data into a first buffer and a second buffer, wherein the first buffer is associated with the first playback device, and wherein the second buffer is associated with the second playback device; and determining, by the at least one processor, where to write the data within each of the buffers based, at least in part, on presentation latencies of the first and second playback devices.

20. The non-transitory computer-readable medium as recited in claim 19, wherein the instructions that determine where to write the data within each of the buffers further causes the at least one processor to perform operations comprising:

determining, by the at least one processor, a first sum equal to a first safety offset added to a first presentation latency for the first playback device;

determining, by the at least one processor, a second sum equal to a second safety offset added to a second presentation latency for the second playback device;

determining, by the at least one processor, a maximum value from amongst the first sum and the second sum;

determining, by the at least one processor, a first latency offset for the first playback device based on a difference between the first sum and the maximum value; and determining, by the at least one processor, a second latency offset for the second playback device based on a difference between the second sum and the maximum value.

21. The non-transitory computer-readable medium as recited in claim 20, wherein the first safety offset indicates a minimum read ahead amount for writing the data for the first playback device, and wherein the second safety offset indicates a minimum read ahead amount for writing the data for the second playback device.

22. The non-transitory computer-readable medium as recited in claim 19, wherein either the first playback device or the second playback device comprises the at least one processor.

23. The non-transitory computer-readable medium as recited in claim 19, wherein each playback device comprises a separate device clock, the operations further comprising:

determining, by the at least one processor, a difference between a first device clock rate of the first playback device and a second device clock rate of the second playback device; and resampling, by the at least one processor, the data to be written into the first buffer based at least in part on the difference.

24. The non-transitory computer-readable medium as recited in claim 23, wherein the difference between the first device clock rate and the second device clock rate is based on a first timestamp information generated by the first playback device and a second timestamp information generated by the second playback device.

25. The non-transitory computer-readable medium as recited in claim 23, wherein the instructions that resample the data to be written into the first buffer based at least in part on the difference further causes the at least one processor to perform operations comprising:

in response to a determination that the first playback device is slower than the second playback device, reducing, by the at least one processor, a size of the data for at least a segment thereof to produce size-adjusted data;

in response to a determination that the first playback device is faster than the second playback device, increasing, by the at least one processor, a size of the data for at least a segment thereof to produce the size-adjusted data; and writing, by the at least one processor, the size-adjusted data to the first buffer instead of the data.

26. The non-transitory computer-readable medium as recited in claim 19, wherein the operations further comprise:

upon reaching an end of the first buffer while writing the data to the first buffer, performing, by the at least one processor, a wrap-around operation to continue writing the data beginning at a start of the first buffer, wherein the first buffer comprises a ring buffer.

27. The non-transitory computer-readable medium as recited in claim 19, wherein the operations further comprise:

acquiring, by the at least one processor, the data as a digital data stream via a wireless connection to a network device.

* * * * *